United States Patent [19]

Thompson

[11] 4,204,378
[45] May 27, 1980

[54] METHOD OF CLOSING A CAPILLARY TUBE

[75] Inventor: Paige W. Thompson, Morrison, Ill.

[73] Assignee: General Electric Company, Fort Wayne, Ind.

[21] Appl. No.: 899,596

[22] Filed: Apr. 24, 1978

[51] Int. Cl.² .......................................... B65B 31/06
[52] U.S. Cl. ..................................... 53/403; 53/477;
219/71; 219/137 R; 228/116; 228/173 F;
228/60; 72/367; 72/416
[58] Field of Search .................. 228/115, 116, 173 R,
228/173 F, 175, 60; 219/137 R, 149, 151, 152,
68, 71; 53/403, 404, 405, 408, 477, 484; 72/367,
416, 411

[56] References Cited

U.S. PATENT DOCUMENTS

| | | | |
|---|---|---|---|
| 1,916,474 | 7/1933 | French et al. | 148/13 |
| 2,469,975 | 5/1949 | McCloy | 228/173 F X |
| 2,568,911 | 9/1951 | Cox et al. | 219/68 X |
| 2,707,584 | 5/1955 | Hoover et al. | 53/484 X |
| 3,141,225 | 7/1964 | Watson | 228/115 X |
| 3,374,126 | 3/1968 | Lingenfelter | 53/405 X |
| 4,001,461 | 1/1977 | Bykhovsky | 219/76.14 |

Primary Examiner—Francis S. Husar
Assistant Examiner—K. J. Ramsey
Attorney, Agent, or Firm—Joseph E. Papin

[57] ABSTRACT

A method of closing an end portion of a metallic capillary tube. In this method, the tube is crimped to form at least a temporary seal adjacent the end portion thereof, and the tube is then fused at the end portion thereof at least adjacent the at least temporary seal so as to perfect the closure of the end portion.

36 Claims, 13 Drawing Figures

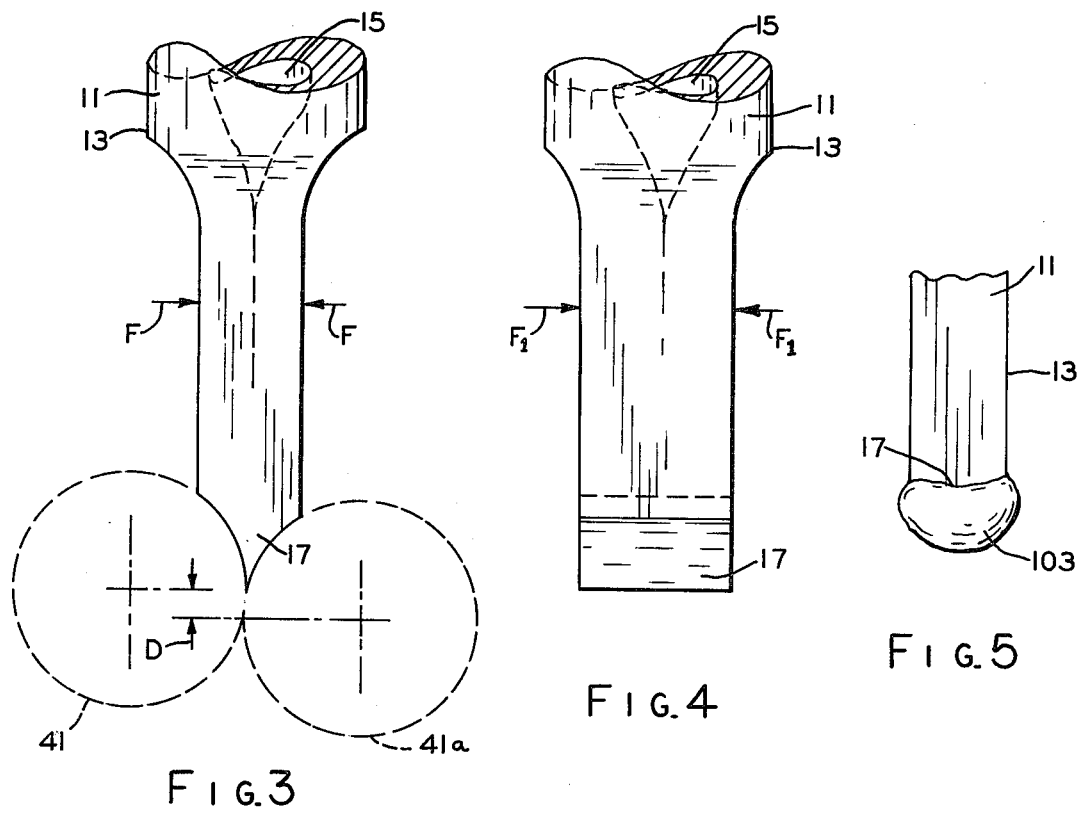
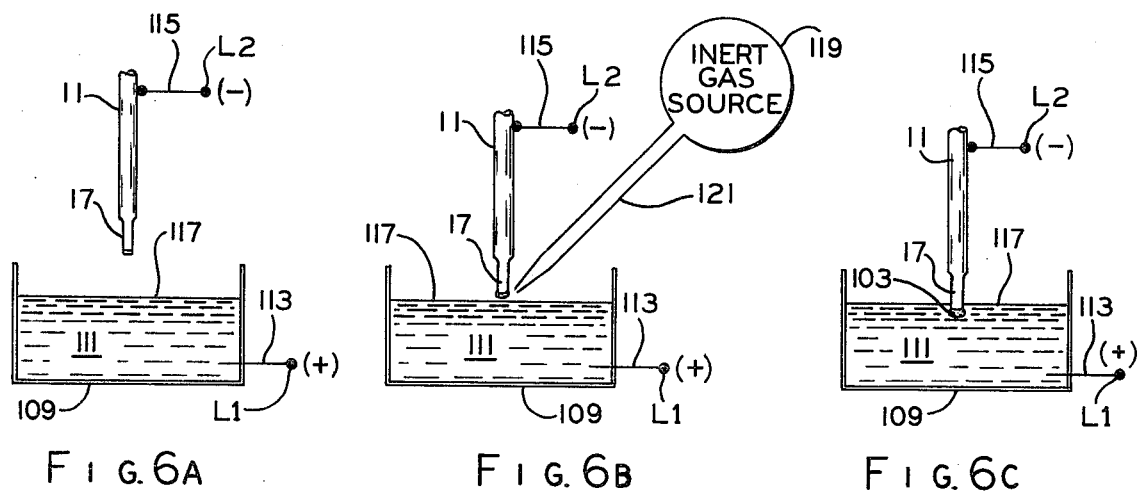

METHOD OF CLOSING A CAPILLARY TUBE

FIELD OF THE INVENTION

This invention relates in general to crimping of metallic capillary tubes and in particular to a method of crimping.

BACKGROUND OF THE INVENTION

In the past, various condition responsive mechanisms utilized a sensing device for ascertaining temperature changes and effecting operation of such condition responsive mechanisms in response to such temperature changes. These sensing devices may comprise an expansible bellows communicated with a generally elongate metallic capillary tube, and such bellows and tube are charged with a temperature sensitive pressure fluid, such as a liquid or a gas for instance. One of the aforementioned condition responsive mechanisms is illustrated in U.S. Pat. No. 3,648,214 issued Mar. 7, 1972 to John L. Slonneger which is incorporated by reference herein.

Numerous arrangements were known in the past for crimping, i.e. closing and sealing, one or both ends of the aforementioned capillary tube to confine the pressure fluid therein. One typical arrangement was to flatten the tube in a limited region thereof and thereafter effect a welding operation on such flattened region. For example, two or more welds were made across the flattened region of the capillary tube, i.e. transverse to the lengthwise direction of the tube, and the tube was then severed between a pair of those crosswise welds so as to provide adequate sealed ends of the tube. In another past crimping arrangement, a tube end was crimped into a semi-circular configuration and thereafter such crimped tube end was sealed by welding or soldering. It is believed that, at least with capillary tube metals, the heating effected during a welding or soldering operation night have a deleterious affect on the physical properties of such metals. In another past crimping arrangement, a metallic capillary tube had its opposite sides collapsed inwardly between a pair of crimping jaws, and while confining these collapsed opposite sides, another pair of crimping jaws were operated to collapse a portion of the tube with sufficient force to sever the tube forming a tapering cold welded end thereon.

SUMMARY OF THE INVENTION

Among the several objects of the present invention may be noted the provision of an improved method of closing a capillary tube which overcomes at least some disadvantageous or undesirable features of the prior art; the provision of such method utilizing crimping and severing dies which are self-aligning and self-adjusting so as to compensate for wear; the provision of such method wherein such dies effect not only a squeeze seal on the capillary tube but also a metallurgical cut-off seal forming a metal-to-metal diffusion for sealing the severed end of the capillary tube; the provision of such method in which the dies are moved with respect to each other in preselected orthogonal patterns to effect the crimping and severing of the capillary tube; the provision of such method in which the severed end of the capillary tube is at least temporarily sealed, then fused and provided with a protective mass of metallic material. These as well as other objects and advantageous features of the present invention will be in part apparent and in part pointed out hereinafter.

In general, a method in one form of the invention is provided for closing a metallic capillary tube. In this method, a pair of dies is moved with respect to each other along first and second generally orthogonal paths to align the dies with the tube disposed therebetween, and the dies are actuated respect to each other along at least another generally orthogonal path to squeeze the tube at a selected region thereof and close the tube at least generally adjacent the selected region thereof.

Still in general, a method in one form of the invention is provided for closing an end portion of a metallic capillary tube. This method comprises the steps of: crimping the tube to form at least a temporary seal adjacent the end portion thereof; and associating the tube with a supply of molten metal as respective opposite electrodes in an arc welding system and welding; the end portion of the tube at least adjacent the temporary seal so as to effect the closure of the end portion of the tube.

BRIEF DESCRIPTION OF THE DRAWINGS

FIG. 3 is a greatly enlarged view of the tube of FIG. 2 illustrating a severed end thereof;

FIG. 4 is a right side elevational view of the tube of FIG. 3;

FIG. 5 is a view of the severed end of the tube of FIG. 3 after the fusing and soldering thereof as practiced in the method of FIG. 1;

FIG. 6a, 6b and 6c illustrate the fusing and soldering of the capillary tube end as practiced in the method of FIG. 1;

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DETAILED DESCRIPTION OF THE PREFERRED EMBODIMENTS

Figure 1:
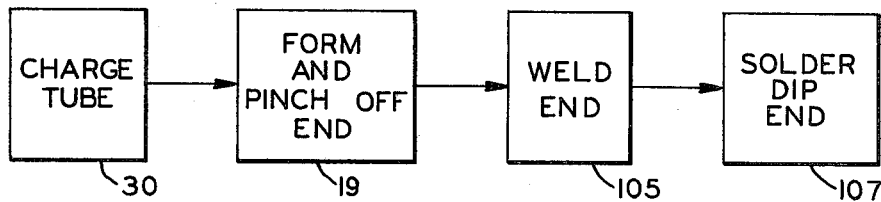
FIG. 1 is a generalized block diagram illustrating a method in one form of the invention for closing a capillary tube.
Figure 2:
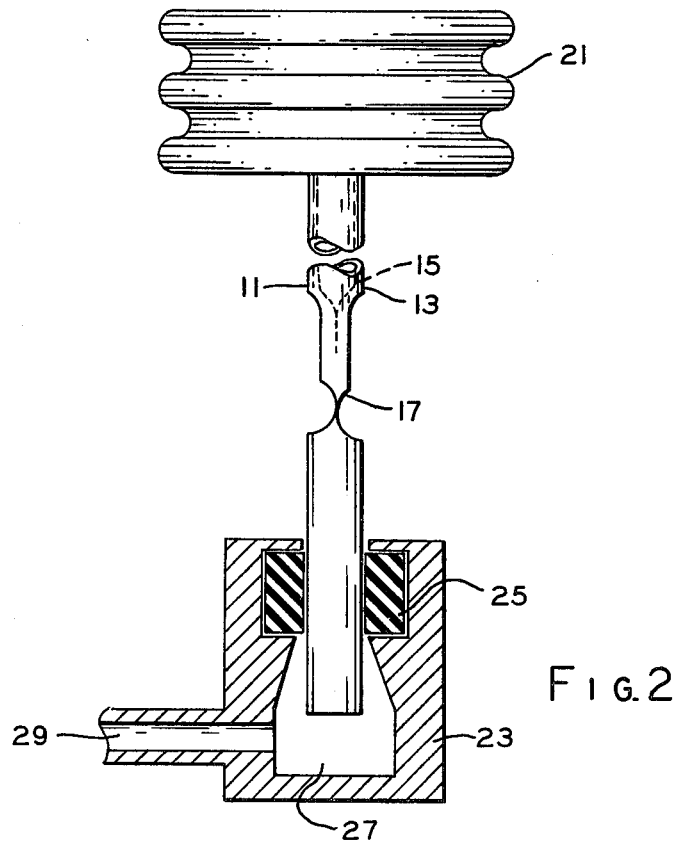
FIG. 2 is a sectional view of an apparatus for for charging the capillary tube associated with the method of FIG. 1.

Referring now to the drawings in general, there is illustrated in one form of the invention a method of closing a metallic capillary tube 11 having a generally cylindric sidewall 13 extending about a capillary opening or passage 15 through the tube (FIG. 2). In this method, opposite portions or sections of sidewall 13 on tube 11 are engaged, and the opposite portions are forced in a direction toward each other to deform the tube (FIG. 3). Other opposite portions or sections of sidewall 13 of tube 15 are confined generally in the same region or area as the first named opposite portions of the sidewall, and the other opposite portions of the sidewall are urged toward each other in another direction generally perpendicular to the first named direction (FIG. 4). Tube 11 is squeezed in the region of the other opposite portions of sidewall 13, and the tube is severed so as to provide a closed end 17 thereon thereby to close passage 15 (FIGS. 2 and 3). This method is defined as box 19 and indicated generally as form and pinch off end in the process summarized in FIG. 1, as discussed in greater detail hereafter.

More particularly and with specific reference to FIG. 2, tube 11 may be communicated with an expansible bellows 21 so as to define a temperature sensing unit for use in a condition responsive mechanism (not shown) of the aforementioned Slonneger U.S. Pat. No. 3,648,214 for instance. Prior to the above discussed method in which tube 11 is pinched off to provide closed end 17, the free end of the tube is placed in a fixture 23 in order to effect the charging of the tube and associated bellows 21 with a temperature sensitive pressure fluid, such as for instance freon gas or a suitable volatile liquid. When so placed in fixture 23, tube 11 extends through fixture seal 25 into an evacuation and charging chamber 27 of the fixture. Initially, chamber 25 as well as tube 11 and bellows 21 are evacuated in response to a vacuum drawn by suitable means (not shown) through port 29 in fluid pressure communication with the chamber, and thereafter the chamber, tube and bellows are charged with the pressure fluid through port 29 by suitable charging means (not shown) associated therewith, as illustrated by box 30 of FIG. 1. When tube 11 and bellows 21 are so charged with the pressure fluid, the tube is deformed and squeezed to ultimately effect the severence thereof forming the free sealed or severed end 17, as set forth in the previously discussed method.

Figure 7:
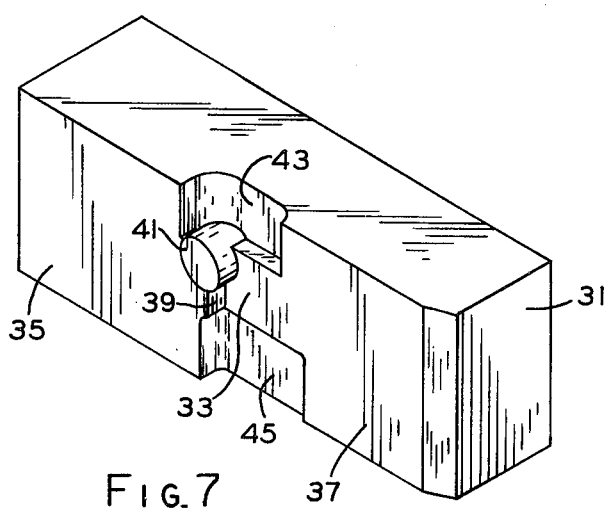
FIG. 7 is a perspective view of one of a pair of similar dies for achieving the crimping and severing configuration of the capillary tube, as illustrated in FIG. 2.
Figure 8:
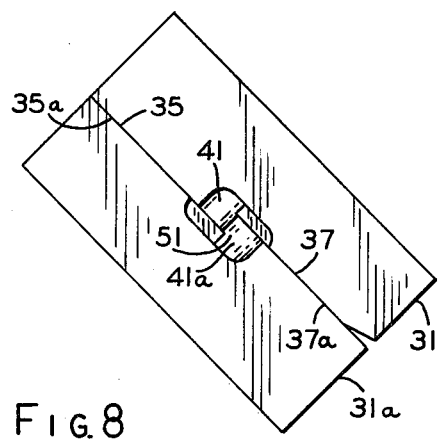
FIGS. 8 and 8a respectively illustrate a plan view of the die pair of FIG. 7 and a schematic diagram of the preferred movement of the die pair to achieve the crimping and severing configuration of the capillary tube as shown in FIGS. 2–4.

To effect the severence of tube 11 and form closed end 17 thereon, the tube is disposed between a pair of opposed means, such as pinch-off dies or jaws 31, 31a for instance, for crimping or forming and also for severing the tube, FIGS. 7 and 8. With crimping and severing means or dies 31, 31a properly aligned and positioned with respect to each other and also tube 11 disposed therebetween in a manner to be discussed subsequently, the dies are forced toward each other, (as illustrated by opposing force arrows F in FIG. 3) to engage and compress the aforementioned opposite portions of tube sidewall 13 between a pair of die faces 33, 33a of the dies. For purposes of drawing simplicity, only die 31 is shown in detail; however, each corresponding part of die 31a, albeit not shown, is indicated by the letter "a" whenever referred to herein. Dies 31, 31a are thereafter moved or slid along the staggered parting plane of faces 35, 37 and 35a, 37a thereof, respectively, to grip the aforementioned other opposite portions of tube sidewall 13 between die faces 39, 39a (as illustrated by opposing force arrows Fl in FIG. 4); and, in this manner, the other opposite portions of the tube sidewall are contained and urged toward each other between die faces 39, 39a. Thus, die faces 33, 33a and 39, 39a are effective to compress, crimp or squeeze tube 11 in two generally orthogonal directions. Further sliding of dies 31, 31a along their parting planes 35, 37 and 35a, 37a cause a pair of hardened pinch-off or severing members, such as rods or pins 41, 41a for instance, to come together (as illustrated in FIG. 3) thereby to sever tube 11 and pinch-off or close closed end 17 of the tube in order to at least temporarily seal tube passage 15 generally in the region of the closed end of the tube. Of course, dies 31, 31a are relieved at 43, 45 and 43a, 45a, respectively, to obviate crimping of tube 11 in these relieved regions.

As previously indicated, dies 31, 31a are mating dies and may be identical except, if desired, a slight off-set D between pinch-off pins 41, 41a may be utilized. This off-set D between pinch-off pins 41, 41a is illustrated in FIG. 3 and coupled with a slight amount of vertical movement, i.e. perpendicular to the plane of FIG. 3, between the pinch-off pins aids in the pinch-off or severence of tube 11.

Figure 8A:
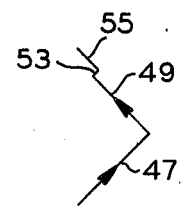

Even though dies 31, 31a may be relatively movable or movable with respect to each other, to illustrate the orthogonal paths or movements of the dies, as shown in FIG. 8A, assume that die 31a remains stationary or in a fixed position during the crimping and severence of tube 11. Under this assumption, die 31 is initially moved toward die 31a along a path 47 which is generally perpendicular to parting planes 35, 37 and 35a, 37a of the dies. During this movement along path 47, no material deformation of tube 11 occurs since this movement is utilized or functions to properly position dies 31, 31a with only a small amount of separation along or between parting planes 35, 37 and 35a, 37a thereof, and with tube 11 captured or otherwise disposed between die faces 33, 33a, respectively. Die 31 is then moved in another direction along a path 49 which is generally perpendicular to path 47 in order to close an opening 51 between parting planes 35, 37 and 35a, 37a of dies 31, 31a and to accurately position tube 11 in the opening between the dies for crimping. With tube 11 so confined within opening 51 and, of course, extending therethrough exteriorly of dies 31, 31a, die 31 is forced or moved along a path 53 toward die 31a to close the remaining separation between parting planes 35, 37 and 35a, 37a, and path 53 is, of course, generally perpendicular to path 49. During the movement of die 31 along path 53, the aforementioned opposite portions of tube sidewall 13 are crimped or at least restrained or contained (as illustrated by the opposed force arrows Fl in FIG. 4), as previously described. Upon the closure of dies 31, 31a at the end of path 53, any flash which might effect or cause die separation has been minimized, and die 31 may be thereafter slid generally along parting planes 35, 37 and 35a, 37a with respect to die 31a along another path 55 which is generally perpendicular to path 53. Of course, movement of die 31 along path 55 not only crimps the aforementioned opposite portions of tube sidewall 13 (as indicated by the opposed force arrows F in FIG. 3) generally simultaneously with the crimping or restraining of the opposite sidewall portion of the tube sidewall (as indicated by the opposed force arrows Fl in FIG. 4) but also brings pinch-off pins 41, 41a together to sever tube 11 and form closed end 17 thereof, as previously described. Upon this formation of closed end 17, it may be noted that a metallurgical seal, i.e., a molecular commingling of the opposite portions of sidewall 13, is formed to at least temporarily seal the closed end portion of tube 11 so as to generally prevent escapement of pressure fluid captured within the tube.

Figure 9:
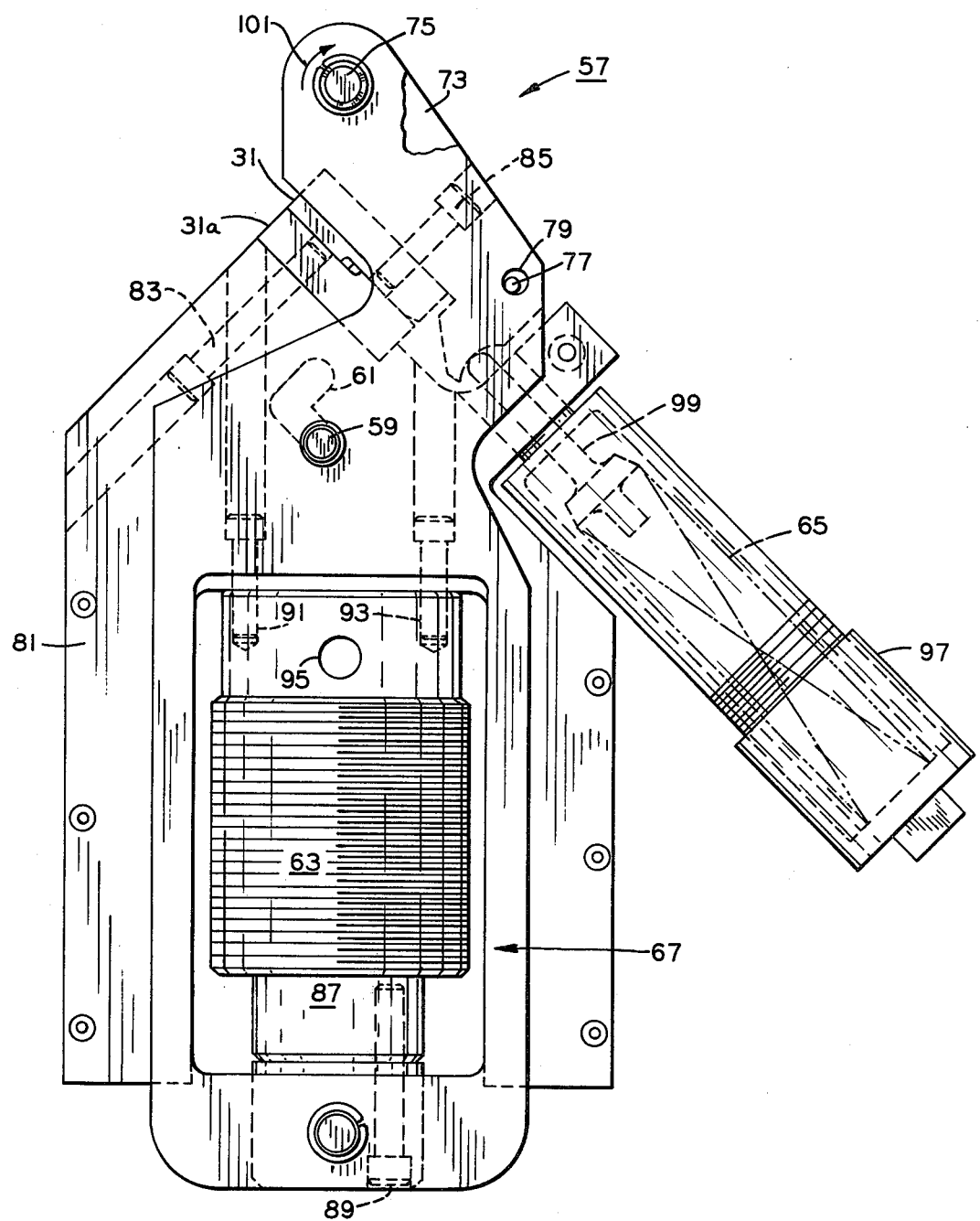
FIG. 9 is a plan view of a device for crimping and severing a capillary tube.

Referring again in general to the drawings and recapitulating at least in part with respect to the foregoing, a device or tool 57 for crimping or reducing the cross-sectional area of tube 11 in a preselected region thereof is provided with a pair of means, such as dies 31, 31a, for crimping and severing the tube (FIG. 9). Means, such as a guide pin 59 or the like slidable and guidably arranged in a generally L-shaped slot 61, is operable generally for effecting relative movement of dies 31, 31a with respect to each other along generally orthogonal paths 47, 49 so as to effect alignment of the dies and properly position or otherwise dispose tube 11 between the dies (FIGS. 8a and 9). Means, such as an actuator 63 and a spring 65, is operable generally for effecting the movement of dies 31, 31a along generally orthogonal paths 53, 55 to effect the reduction of the cross-sectional area of tube 11 and the severence thereof, respectively (FIGS. 8A, 9 and 10).

Figure 10:
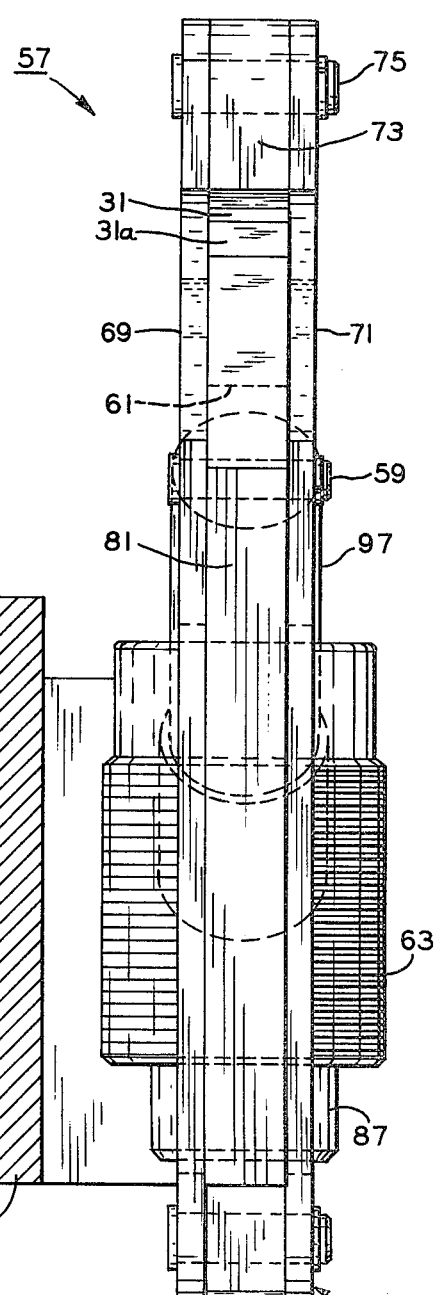
FIG. 10 is a side elevational view of the device of FIG. 9.

More particularly and with specific reference to FIGS. 8A, 9 and 10, crimping tool 57 has a frame 67 including substantially identical spaced apart plates 69, 71 which pivotably support die 31 on an arm 73 pivotable about a pivot pin 75 within the limits imposed by a restraining pin 77 and an oversized hole 79 in the arm. A slide 81 supports die 31a with the slide being movable or slidably confined or sandwiched at least in part between plates 69, 71. Slide 81 is further coupled to frame 67 by pin 59 disposed between plates 69, 71 and which limits the movement of the slide relative to the frame to a slide path defined by L-shaped slide slot 61 provided in the slide. Die 31a is affixed in an easily removable manner to slide 81 by suitable means, such as a cap screw 83, while die 31 is similarly affixed to pivotable member or arm 73 by suitable means, such as a cap screw 85. Actuator 63 may comprise a spring loaded hydraulic cylinder for instance with a piston 87 connected to the frame 67 by suitable means, such as pins 89 for instance, and the hydraulic cylinder has its other end affixed by suitable means, such as screws 91, 93 to slide 81. Actuation by supplying a hydraulic fluid by way of a port 95 in cylinder 63 extends piston 87 therefrom moving slide 81 upwardly relative to frame 67. Slide 81 also supports a generally cylindric housing or sleeve 97 containing therein spring 65 which is preloaded to urge a rod 99 out of sleeve 97. Spring loaded rod 99 engages pivotable arm 73 along a line of actuation so that the compressive force of spring 65 imparts a clockwise moment to the arm in the direction of arrow 101, as viewed in FIG. 9. Thus, spring 65 tends to force die 31 toward die 31a when slide 81 is moving upwardly, moving die 31a toward die 31. Tool 57 may have either frame 67 or slide 81 affixed to a base 103 for convenient support, as desired.

To illustrate the movement of dies 31, 31a through the orthogonal paths 47, 49, 53, 55 shown in the diagram of FIG. 8A upon the operation of tool 57, the actuation of cylinder 63 moves slide 81 upwardly thereby causing the slide to move die 31a toward die 31 along path 47 since pin 59 is sliding in L-shaped slot 61 generally in the direction perpendicular to parting plane 35, 37 and 35a, 37a of dies 31,, 31a, FIGS. 8 and 9. At the end of movement path 47, pin 59 is at the intermediate point of L-shaped slot 61, i.e. between the legs thereof, and further extension of piston 87 causes slide 81 and die 31a to traverse path 49 of FIG. 8A and with the slot 61 moving upwardly and to the left as best seen in FIG. 9, until pin 59 is positioned in slot 61 as illustrated in FIG. 9. At this time, or shortly therebefore, spring loaded rod 99 engages pivotable arm 73 causing the arm to pivot in the clockwise direction about pivot pin 75, as indicated by arrow 101, thus moving die 31 toward die 31a in a direction generally perpendicular to parting planes 35, 37 and 35a, 37a of the dies along paths 53, 53a. Of course, in the event a smaller diameter tube is being crimped, parting planes 35, 37 and 35a, 37a may close causing movement of dies 31, 31a through path 49, and in this event, the smaller sized tube is only restrained between the dies, i.e. not crimped or squeezed along the opposite sides of tube sidewall 13 (as indicated by force arrows F1 in FIG. 4) when the opposite sides of the tube sidewall (as indicated by force arrows F in FIG. 3) are simultaneously crimped by the dies during their movement through path 55. This pivoting movement of arm 73 insures good alignment between the faces of dies 31, 31a, and thereafter the last amount of movement of die 31a along parting planes 35, 37 and 35a, 37a between dies 31, 31a, as illustrated by path 55, completes the crimping operation.

Referring again in general to the drawings and recapitulating at least in part with respect to the foregoing, another method in one form of the invention is provided for closing tube 11. In this method, dies 31, 31a are moved with respect to each other along generally orthogonal paths 47, 49 to effect the proper alignment of the dies with tube 11 disposed therebetween (FIGS. 7, 8 and 8A). Dies 31, 31a are then further moved or actuated along at least generally orthogonal paths 55, 55a to squeeze tube 11 at a selected or preselected region or section thereof and close the tube at least generally adjacent the preselected region thereof (FIGS. 3, 4, 7, 8 and 8A).

Another method in one form of the invention is also illustrated for closing end 17 of tube 11. In this method, tube 11 is crimped or otherwise deformed so as to form at least a temporary seal generally at end 17 thereof (FIGS. 2–4), and the tube at its end is fused by suitable means, such as a weld 103 or the like for instance, spaced from the temporary seal so as to perfect the sealing of end 17 (FIG. 6B). Thereafter, if necessary or if desired, a protective mass of suitable material, such as a drop or globule of solder 103 for instance, is adhered or otherwise fixedly attached to fused end 17 of tube 11 (FIGS. 5 and 6C). Of course, the fusing or welding step and the adhering or soldering step, if desired, of this method are respectively illustrated in boxes 105, 107 of the process illustrated in FIG. 1.

More particularly and with specific reference to FIGS. 6A, 6B and 6C, subsequent to the severence of tube 11, as discussed above, the tube is moved or otherwise positioned so as to be disposed with respect to a source, such as a container 109, having a suitable welding and/or dipping material therein, such as molten solder or tin 111 for instance, as best seen in FIG. 6A. In this arrangement, an arc welding circuit or system is effected by connecting molten solder 111 in container 109 by suitable means, such as a lead 113 for instance, to a positive side L1 of a low voltage high current power source so that the molten solder defines an electrode of the arc welding circuit, and the severed tube 11 is connected by suitable means, such as a lead 115 or the like, to the negative side L2 of the power source so that the tube defines an opposite electrode of the arc welding circuit. Thereafter, as shown in FIG. 6B, severed or closed end 17 of tube 11 is lowered toward a preselected or welding position at least adjacent the surface 117 of molten solder 111 in container 109, and an arc is formed between the closed end 17 of the tube and the solder surface. In this manner, current flows between closed end 17 of tube 11 and molten solder 111 thereby to fuse or melt the tube material (for example a plated or tinned copper) generally at the closed end 17. Thus, the metal of tube 11 generally at the tip or closed end 17 thereof is fused so as to form a welded seal which not only effects or perfects the closure or sealing of the closed end of tube 11 but is at least adjacent the aforementioned at least temporary closure or seal effected during the pinch-off or severence of tube 11, as previously discussed. Thus, the temperature sensitive pressure fluid is prevented from escaping from tube 11.

To avoid oxidation problems associated with the arc-welding operation illustrated in FIG. 6B, a source 119 of inert gas, such as argon for instance, may be supplied by way of a conduit 121 to the region between molten solder surface 117 and tube end 17 thereby preventing oxidation of the material of tube 11 and also reducing any slag formation on surface 117 of molten solder 111. Subsequent to the welding or fusing of closed end 17 of tube 11, the tube may be then withdrawn slightly, for example back to the position illustrated in FIG. 6A, breaking the arc, and maintained the withdrawn position until the fused metal at closed end 17 of tube 11 has solidified. However, it is contemplated that the arc may be extinguished by interrupting the arc welding circuit thereby to terminate the welding of tube 11 within the scope of the invention so as to meet the objects thereof. If desired or if necessary, preferably shortly after this solidification and before tube 11 has cooled, the tube may be immersed into molten solder 111, as illustrated in FIG. 6C, to effect the adherence or formation of a protective coating or layer of solder about the weld on closed end 17 of tube 11. A solder coating about the weld on closed end 17 of tube 11 may be necessary if the tube is to be associated with a metal incompatible with that of tube 11 so as to prevent corrosion.

From the foregoing it is now apparent that a novel device 57 as well as novel methods of closing a metallic capillary tube has been disclosed meeting the objects and advantageous features set out hereinbefore, as well as others, and that modifications as to the precise configurations, shapes, details and connections, as well as the precise steps of the methods, may be made by those having ordinary skill in the art without departing from the spirit of the invention or the scope thereof, as set out by the claims which follow.

I claim:

1. A method of closing a metallic capillary tube comprising the steps of:
   (a) moving a pair of dies with respect to each other along first and second generally orthogonal paths to align the dies with the tube disposed therebetween; and
   (b) actuating the dies with respect to each other along at least another generally orthogonal path to squeeze the tube at a selected region thereof and close the tube at least generally adjacent the selected region thereof.

2. A method of closing an end portion of a metallic tube comprising these steps of:
   (a) engaging first opposite portions of the tube at least adjacent the end portion thereof to be closed and forcing the first opposite portions in a first direction toward each other;
   (b) engaging second opposite portions of the tube at least adjacent the end portion thereof to be closed and urging the second opposite portions toward each other in another direction generally perpendicular to the first named direction;
   (c) pinching off the tube generally in the same direction as the first named direction to form at least a temporary seal at least adjacent the end portion of the tube and with the deformations of the tube during the engaging and forcing step, the engaging and urging step, and the pinching off step including moving a pair of dies with respect to each other at least in the first named direction and the another direction through a plurality of preselected paths; and
   (d) welding the end portion of the tube at least adjacent the at least temporary seal so as to insure the closure of the end portion of the tube.

3. The method as set forth in claim 2 comprising the additional step of adhering a protective mass of material generally about the welded end portion of the tube.

4. The method as set forth in claim 3 wherein the adhering step comprises immersing the welded end portion of the tube into a supply of the protective material while the welded end portion is at a temperature substantially above the ambient temperature.

5. The method as set forth in claim 2 comprising the preliminary step of charging at least the tube with a temperature sensitive pressure fluid.

6. The method as set forth in claim 2 wherein the welding step comprises connecting the tube as an electrode in an arc welding system so as to effect the welding of the end portion of the tube to insure the sealing thereof.

7. The method as set forth in claim 6 wherein the protective material is a solder and wherein the adhering step comprises immersing the end portion of the tube subsequent to the welding thereof into a supply of molten solder while the temperature of the end portion is elevated due to the welding thereof above the ambient temperature.

8. The method as set forth in claim 6 wherein a supply of molten metal forms the other electrode of the arc welding system.

9. The method as set forth in claim 2 wherein the welding step comprises applying heat to the end portion of the tube to fuse the metal thereof at least generally adjacent the end portion.

10. A method of closing an end portion of a metallic capillary tube comprising the steps of:
    (a) connecting the tube in an arc welding circuit as one electrode thereof with a supply of molten metal being connected in the arc welding circuit as an opposite electrode thereof;
    (b) moving the tube with respect to the molten metal supply and disposing the end portion of the tube in a welding position at least adjacent the surface of the molten metal supply;
    (c) creating an arc between the end portion of the tube and the molten solder supply when the end portion of the tube is in its welding position and fusing the metal of the tube adjacent the end portion to effect a sealing closure thereof.

11. The method as set forth in claim 10 comprising the preliminary step of pinching off the end portion of the tube and closing it so as to effect at least a temporary sealing thereof.

12. The method as set forth in claim 11 comprising the further preliminary step of charging the tube with a temperature sensitive pressure fluid prior to the pinching off step.

13. A method of closing a metallic tube having a sidewall extending about an opening through the tube, the method comprising these steps of:
   (a) engaging first opposite portions of the sidewall of the tube and forcing the first opposite sidewall portions in a direction generally toward each other;
   (b) at least confining movement of second opposite portions of the sidewall of the tube generally in the same region as the first opposite sidewall portions in response to the movement of the first opposite sidewall portions toward each other;
   (c) squeezing the tube in the region of the first and second opposite sidewall portions so as to at least temporarily seal the opening in the tube and severing the tube at least adjacent the at least temporary seal so as to provide a free end on the tube, the deformations of the tube during the engaging and forcing step, the at least confining step, and the squeezing and severing step including moving a pair of dies with respect to each other in generally perpendicular directions through a plurality of preselected paths; and then
   (d) fusing the metal of the tube at least generally adjacent the free end of the tube to insure the sealing of the opening in the tube.

14. The method as set forth in claim 13 comprising the preliminary step of charging at least the tube with a temperature sensitive pressure fluid and maintaining the charge until the closed end is created.

15. A method of closing an end portion of a metallic tube comprising the steps of:
   (a) crimping the tube to form at least a temporary seal at least adjacent the end portion of the tube; and
   (b) associating the tube with a supply of molten metal as respective opposite electrodes in an arc welding system and welding the end portion of the tube at least adjacent the temporary seal so as to effect the closure of the end portion of the tube.

16. The method as set forth in claim 15 comprising the preliminary step of charging at least the tube with a temperature sensitive pressure fluid.

17. The method as set forth in claim 15 comprising the additional step of adhering a protective mass of the metal from the supply thereof generally about the welded end portion of the tube.

18. The method as set forth in claim 17 wherein the adhering step comprises immersing the welded end portion of the tube into the molten metal supply while the temperature of the welded end portion is elevated due to the welding thereof above the ambient temperature.

19. The method as set forth in claim 17 wherein the molten metal is a solder.

20. The method as set forth in claim 15 wherein the crimping step comprises severing the tube so as to define the end portion thereof and form the at least temporary seal at least adjacent the end portion.

21. A method of closing an end portion of a metallic tube comprising these steps of:
   (a) forcing a first pair of generally opposite sides of the tube in a first direction generally toward each other;
   (b) at least limiting movement of a second pair of generally opposite sides of the tube in another direction generally perpendicular to the first direction and in response to the forcing of the first opposite side pair of the tube,
   (c) severing the tube so as to define the end portion thereof and to form at least a temporary seal at least adjacent the end portion of the tube; and
   (d) associating the tube and a supply of molten material as respective electrodes in an arc welding system and welding the end portion of the tube at least adjacent the at least temporary seal so as to effect the closure of the end portion of the tube.

22. The method as set forth in claim 21 comprising the preliminary step of charging at least the tube with a temperature sensitive pressure fluid.

23. The method as set forth in claim 21 comprising the preliminary step of associating another end portion of the tube generally opposite the first named end portion thereof in sealing relation with a bellows.

24. The method as set forth in claim 23 comprising the intermediate step of charging both the bellows and the tube with a temperature sensitive pressure fluid prior to the severing step.

25. The method as set forth in claim 21 wherein the severing step comprises sealing the first opposite side pair metallurgically to each other so as to form the at least temporary seal therebetween.

26. The method as set forth in claim 21 comprising the additional step of immersing the welded end portion of the tube into the molten material of the supply thereof while the temperature of the welded end portion is elevated due to the welding thereof above the ambient temperature so as to adhere generally about the welded end portion a protective mass of the material.

27. The method as set forth in claim 21 comprising the additional step of adhering a protective mass of material generally about the welded end portion of the tube.

28. A method of closing a metallic capillary tube having a sidewall extending about an opening through the tube comprising the steps of:
   (a) engaging first opposite positions on the sidewall of the tube and forcing the first opposite sidewall portions in a direction generally toward each other;
   (b) confining second opposite portions on the sidewall of the tube generally in the same region as the first opposite sidewall portions and urging the second opposite sidewall portions toward each other in another direction generally perpendicular to the first named direction; and
   (c) squeezing the tube in the region of the first and second opposite sidewall portions and severing the tube so as to provide at least a temporary seal at least adjacent the severed end of the tube, the deformation of the tube during the preceding engaging and forcing step, confining and urging step, and squeezing and severing step being respectively effected by moving at least one die of a pair thereof with respect to the other of the dies in generally perpendicular directions through a plurality of preselected paths.

29. The method as set forth in claim 28 comprising the additional step of fusing the severed end of the tube to insure the closure of the opening in the tube.

30. The method as set forth in claim 29 comprising the further additional step of securing a protective mass of material generally about the fused severed end of the tube.

31. The method as set forth in claim 29 wherein the fusing step comprises associating the tube and a supply of molten metal as respective opposite electrodes in an arc welding system and welding the severed end of the tube at least adjacent the at least temporary seal.

32. The method as set forth in claim 31 wherein the associating and welding step includes moving the tube to a welding position with the severed end disposed adjacent the level of the molten metal in the supply thereof.

33. The method as set forth in claim 31 comprising the further additional step of immersing the welded severed end of the tube into the supply of the molten metal while the temperature of the welded severed end is elevated due to the welding thereof above the ambient temperature.

34. The method as set forth in claim 28 comprising the preliminary step of charging at least the tube with a temperature sensitive pressure fluid.

35. The method as set forth in claim 34 wherein the opening of the tube is associated in pressure fluid communication with a bellows.

36. A method of closing an end portion of a metallic capillary tube, the method comprising the steps of:
(a) crimping the tube to form at least a temporary seal adjacent the end portion thereof;
(b) connecting the tube as an electrode in an arc welding system with a supply of molten solder forming the other electrode thereof and welding the end portion of the tube to insure the sealing thereof; and
(c) immersing the end portion of the tube subsequent to the welding thereof into the supply of molten solder while the temperature of the end portion is elevated due to the welding thereof above the ambient temperature so as to adhere a protective mass of the solder onto the end portion of the tube.

* * * * *